United States Patent [19]
Ayers et al.

[11] Patent Number: 5,204,952
[45] Date of Patent: Apr. 20, 1993

[54] DUPLEX PROCESSOR ARRANGEMENT FOR A SWITCHING SYSTEM

[75] Inventors: David J. Ayers, Carp; Jacob Guttman, Kanata, both of Canada

[73] Assignee: Northern Telecom Limited, Montreal, Canada

[21] Appl. No.: 734,033

[22] Filed: Jul. 23, 1991

Related U.S. Application Data

[63] Continuation of Ser. No. 247,793, Sep. 22, 1988, abandoned.

[30] Foreign Application Priority Data

Jul. 18, 1988 [CA] Canada .................................. 572331

[51] Int. Cl.⁵ .............................................. G06F 15/16
[52] U.S. Cl. .................................... 395/550; 395/575
[58] Field of Search .............................. 395/550, 575

[56] References Cited

U.S. PATENT DOCUMENTS

| | | | |
|---|---|---|---|
| 3,602,900 | 10/1969 | Delaigue et al. | 364/200 |
| 3,651,480 | 3/1972 | Downing et al. | 370/62 |
| 3,681,578 | 8/1972 | Stevens | 371/36 |
| 3,810,119 | 5/1974 | Zieve et al. | 364/200 |
| 4,213,201 | 7/1980 | Gagnier et al. | 395/550 |
| 4,589,066 | 5/1986 | Lam et al. | 364/200 |
| 4,591,977 | 5/1986 | Nissen et al. | 364/200 |
| 4,713,755 | 12/1987 | Worley, Jr. et al. | 364/200 |
| 4,799,140 | 1/1989 | Dietz et al. | 364/200 |
| 4,827,401 | 5/1989 | Hrustich et al. | 364/200 |
| 4,839,855 | 6/1989 | Van Driel | 364/900 |
| 4,933,835 | 6/1990 | Sachs et al. | 364/200 |
| 4,987,534 | 1/1991 | Sekiguchi | 364/200 |

Primary Examiner—Dale M. Shaw
Assistant Examiner—C. Shin
Attorney, Agent, or Firm—F. P. Turpin

[57] ABSTRACT

The invention provides a duplex processor arrangement wherein the processors are only pseudo-synchronized to each other. Each processor is provided with its own independent clock circuit and the two clock circuits operate at the same nominal frequency. A circuit means is provided for periodically forcing a rendezvous between processors whereat a controller circuit ensures that the processors have processed the same information since the last rendezvous. Each processor comprises a match circuit including memory means connected to store address/data information related to instructions performed by the processors. Each match circuit compares the information from the processors and generates an alarm signal upon a mismatch.

8 Claims, 9 Drawing Sheets

DUPLEX PROCESSOR ARRANGEMENT FOR A SWITCHING SYSTEM

This application is a continuation of application Ser. No. 247,793, filed Sep., 22, 1988, now abandoned.

FIELD OF THE INVENTION

The invention relates generally to telephone switching systems and more particularly to a duplicated processor arrangement for such systems. Even more particularly, the invention relates to a pseudo-synchronized arrangement of duplicated processors in a data processing system.

DESCRIPTION OF THE PRIOR ART

Since telephone switching systems are required to work in real time for twenty four hours each day, the reliability considerations are of the utmost importance in their design. In order to achieve the desired reliability, a number of design techniques are employed, including redundancy. However, because of its cost, a strategy of redundancy must be applied selectively.

One such well-known system is described in U.S. Pat. No. 3,651,480 issued to Bell Telephone Laboratories, Inc., in 1972. In this system, the central processor is fully duplicated and includes a pair of functionally equivalent central controls and a memory system which comprises a plurality of independent duplicated memories. The pair of central controls and the duplicated memories may be selectively connected to form first and second central processors each comprising a central control and a memory system.

A similar system is described in U.S. Pat. No. 4,213,201 issued to Northern Telecom Limited in 1980. In this system, the central control is fully duplicated, including the central processing unit (CPU), the data store, the program store, and the central message controller (CMC). The two CMCs connect the central processor to the rest of the system, specifically to the network controllers and input/output controllers. This system therefore provides a fully duplicated central control, one half of which is active and the other half is inactive.

Each of these systems contain numerous fault detection mechanisms. Sanity of the central control itself is ensured by operating the CPUs and memories in a matched mode also referred to as lock-step. In this mode, each of the duplicated CPUs executes identical steps and compares its results with those of its duplicated mate through extensive data matching circuitry on the completion of each processor microcycle. Each processor waits until the accesses to both memory systems are completed before proceeding to the next microcycle. This automatically takes into account delays introduced by asynchronous refreshing of the dynamic memories.

In order for the matching operation to operate satisfactorily, the two CPUs must be tightly synchronized. In the existing systems, this is achieved through the use of a duplicated clock source wherein the two CPUs of a duplicate pair are driven from the same clock source. If the driving clock should fail for any reason, its mate clock is switched to active status to drive the two CPUs whereas the failed clock is switched to inactive and a failure indication is provided. Since the new driving clock probably has a signal phase different from the failed clock, a certain amount of realignment is usually necessary including resetting of the CPU.

With the evolution of technology, the design of switching systems is continually evolved to provide increased performance. One of the desirable changes foreseen for these systems is an increase of clock frequency in order to take full advantage of new generations of microprocessors. However, as the clock system frequency reaches twenty megahertz and above, the lock-step method of providing duplex processors begins to suffer from serious deficiencies. The system becomes sensitive to clock skew and to clock duty cycle thereby making the task of driving duplex processors from a single clock source very tenuous. At those increased frequencies, it also becomes very difficult to reliably cross-couple clock signals between processors. Additionally, the time differences between memory systems' accesses become critical to the matching operation thus resulting in the necessity for handshaking between processors with the ensuing loss of real time processing capability. In fact, at these increased frequencies the synchronized operation of duplex processors becomes a liability rather than a tool for ensuring system reliability.

SUMMARY OF THE INVENTION

It is therefore an object of the invention to provide a switching system having duplicated processors which do not exhibit the problems inherent with the present lock-step method of operating duplicated processors.

It is also an object of the invention to provide a duplex processor arrangement that is compatible with significantly faster CPU clock rates than are presently in use and which is also compatible with future CPU architectural trends.

It is yet another object of the invention to provide a duplex processor arrangement that is insensitive to clock skew and duty cycle as well as to control signal variations between the processors.

It is a further object of the invention to provide a duplex processor arrangement that is compatible with existing switching systems and which does not add appreciable overhead to CPU performance.

In accordance with the invention there is provided a duplex processor arrangement wherein the processors are only pseudo-synchronized to each other. Each processor is provided with its own independent clock circuit and the two clock circuits operate at the same nominal frequency. A circuit means is provided for periodically forcing a rendezvous between processors and controller and match circuits ensure that the processors have processed exactly the same information with identical results since the previous rendezvous. Each match circuit includes a pair of memories, each one associated with a respective processor and connected to temporarily store address/data information related to instructions performed by the processors. Each match circuit compares the information in its memories and generates an alarm signal upon a mismatch.

From another aspect, the invention provides a method of controlling a duplex processor arrangement comprising a pair of computing circuits each comprising a processor portion including a microprocessor and an associated instruction cache memory and a control portion including a maintenance controller, a match circuit and an interrupt controller. Each of the computing circuits is driven with signals from respective independent clock circuits having the same predetermined nominal rate. The computing circuits are periodically forced to a rendezvous whereat they are forced to halt their operation until it has been determined that they have processed the same information since the previous rendezvous.

BRIEF DESCRIPTION OF THE DRAWINGS

An embodiment of the invention will now be described in conjunction with the accompanying drawings wherein.

Figure 1:
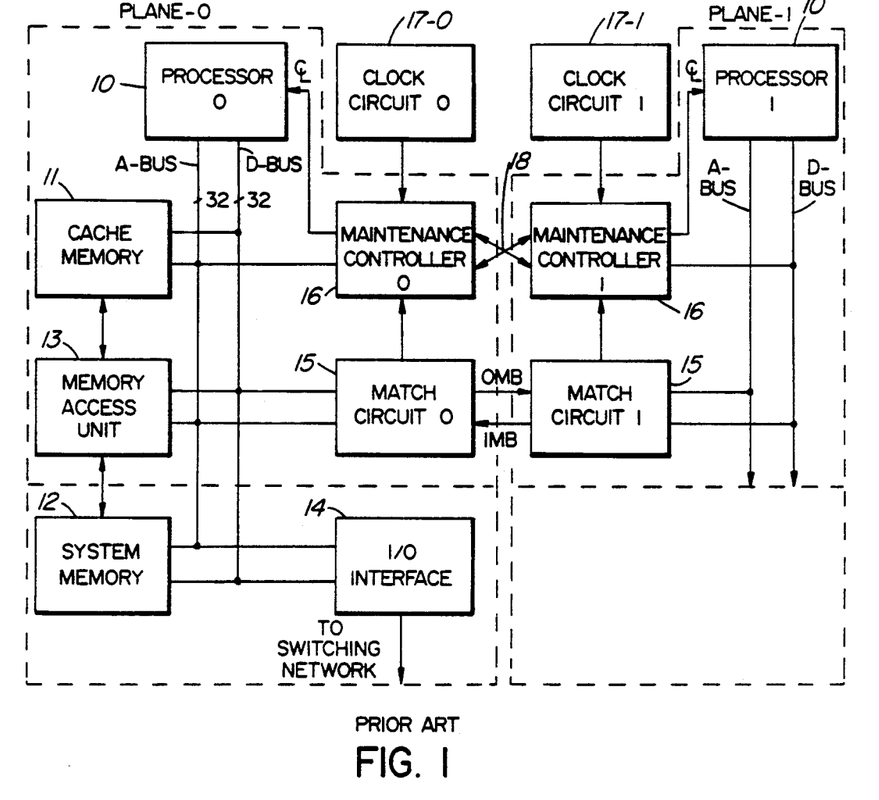
FIG. 1 is a block circuit diagram of a contemporary duplex central processor arrangement for a switching system.

FIG. 1 illustrates a typical duplex processor arrangement presently in use in contemporary telephone switching systems. The arrangement comprises identical plane 0 and plane 1 circuitry. Each plane comprises a processor 10 and a memory system which may include a cache memory 11, a system memory 12 and a memory access unit 13. The processor 10 communicates with the memory system via an address bus and a data bus and it communicates to the remainder of the switching system via these buses and an input/output interface circuit 14. The operation of each plane's processor is monitored by a match circuit 15 and a maintenance controller 16.

Associated with the processor system of each plane is one of a pair of clock circuits 17-0 and 17-1, each one connected to a respective one of controllers 16-0 and 16-1. However only one of clock circuits 17-0 or 17-1 is actually connected to both processor systems at any one time through the maintenance controllers 16-0 and 16-1 which are cross-connected by a multiconductor bus 18. If the clock circuit driving the duplex processors fails, the maintenance controllers disable that clock and connect the other clock circuit to drive both processor systems.

Figure 2:
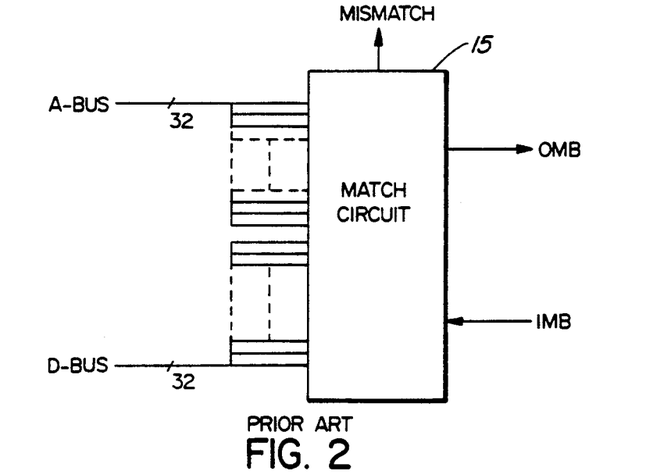
FIG. 2 is a logic diagram of a match circuit for use in the arrangement of FIG. 1.

In a duplex processor arrangement such as illustrated in FIG. 1, the processors 10 progress along a software stream in lock-step mode. That is, one processor performs the same instruction as the other processor. At each instruction being performed, the data and address information appearing on the A-bus and the D-bus of each plane is exchanged between the match circuits 15 on the outgoing match bus (OMB) and incoming match bus (IMB). As illustrated in FIG. 2 each match circuit 15 basically comprises a wide comparator circuit. If a mismatch is detected, mismatch signals are sent to the maintenance controllers 16 who then initiate maintenance procedures to identify the source of the problem and initiate corrective measures to ensure continuous functioning of the switching system. These functions are presently well known in the art as exemplified by the systems described in the aforementioned documents.

In this type of system, interrupt signals as well as data transfers between the processor and the system memory and the input/output ports are done on a handshaking basis at every instance. That is, a subsequent instruction is not fully processed until the monitoring circuitry allows it to proceed. Under some circumstances, this arrangement can result in real-time wastage due to delayed acknowledgements from the destination subsystems.

As mentioned above, it is desirable to realize new data processor systems using the more recently available devices because of their potential for increased throughput. Further improved performance may be achieved by increasing the clock rate of the processor. However, any such speed improvement tends to decrease the already narrow margins of error in the control signal skew between the subsystems and the processor resulting in the match circuitry generating an increasing number of mismatch signals to the maintenance circuitry. This problem can be alleviated to a large extent by releasing the processing systems from the handshake procedure between the processors on every instruction.

Figure 3A:
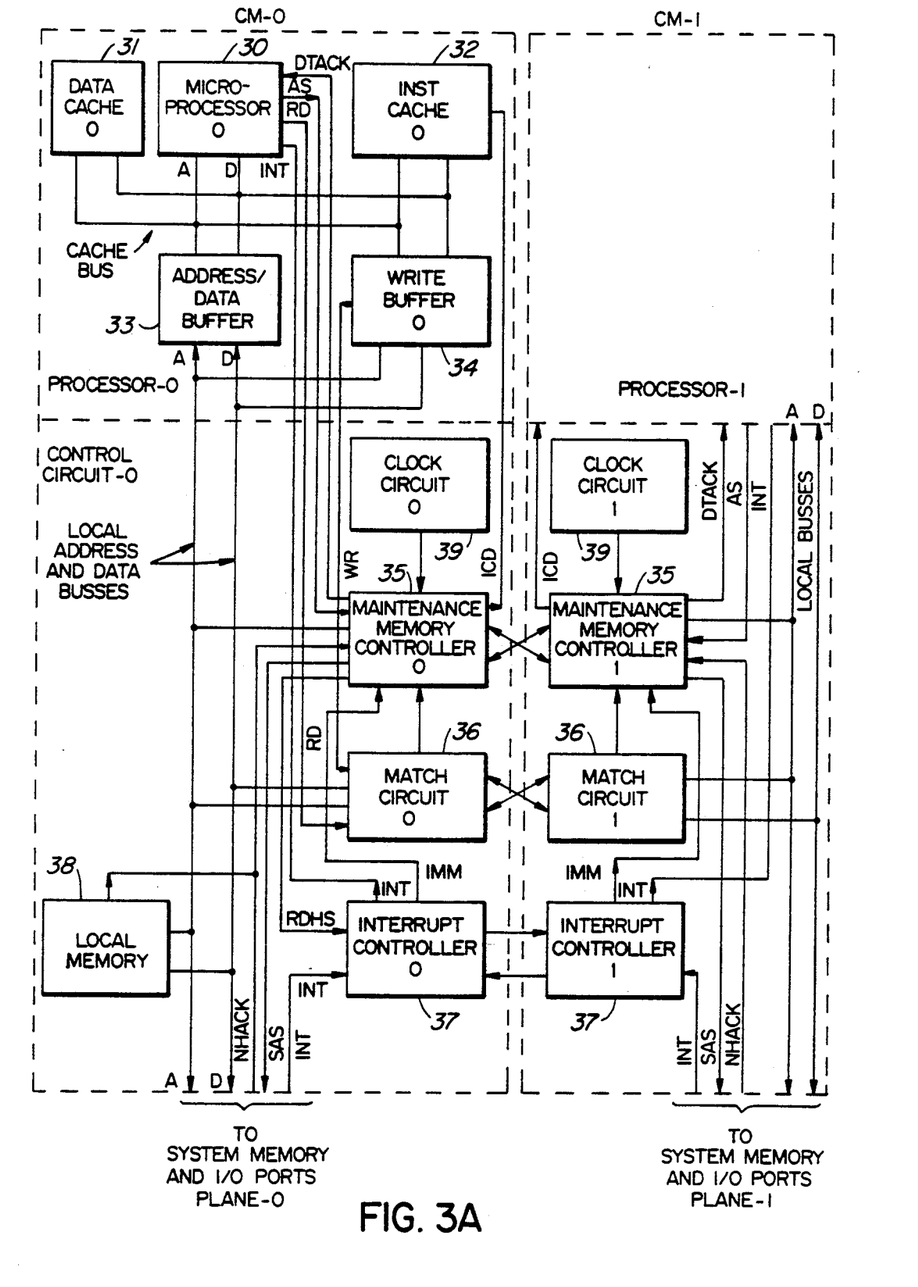
FIG. 3A is a block circuit diagram of a duplex processor arrangement in accordance with the present invention.

FIG. 3A shows duplex computing modules CM-0 and CM-1, each one of which is adapted to function as the plane-0 or plane-1 central processor in a contemporary switching system. In view of increased miniaturization of microprocessors (MP) and other integrated circuits, it is possible to realize an entire computing module on a printed circuit board including a portion of system memory. Since CM-0 is identical to CM-1 only one of them will be described except when the operation requires an exchange of data between modules. It is of course desirable to embody only one of CM-0 or CM-1 on a single printed circuit board to provide for the exchange of a failed module without interruption of the operation of the switching system.

Each computing module comprises a processor section and a control section. The processor section includes a microprocessor (MP) 30, a data cache 31, an instruction cache 32 as well as an address/data buffer 33 and a write buffer 34. These units are interconnected by a cache bus and communicate to the remainder of the CM via local buses comprising an address bus and a data bus as well as various control leads as described later. The processor section units operate in the conventional manner as for example described in the manuals for the various microprocessors such as for example the 68020 microprocessor from Motorola semiconductors or the R2000 microprocessor from MIPS Computer Systems Inc. Such processor configurations employ a dual bus architecture wherein the microprocessor (MP) communicates through a very high speed bus to multiple caches or to multiple cache/memory management units. Some of these implementations provide on-chip caches with the MP. In these arrangements, the MP and cache subsystems communicate to the outside world via a memory bus. Since there are various subsystems which may be fetching or storing on behalf of the MP, the level of the bus traffic is very different between the cache and memory buses.

The MP and cache modules should be considered as a processor subsystem which communicates to various memory hierarchies and input/output (I/O) ports. The cache bus is dedicated to communication between the MP and caches and is not intended for any applications other than for complementary high speed co-processors.

Figure 3B:
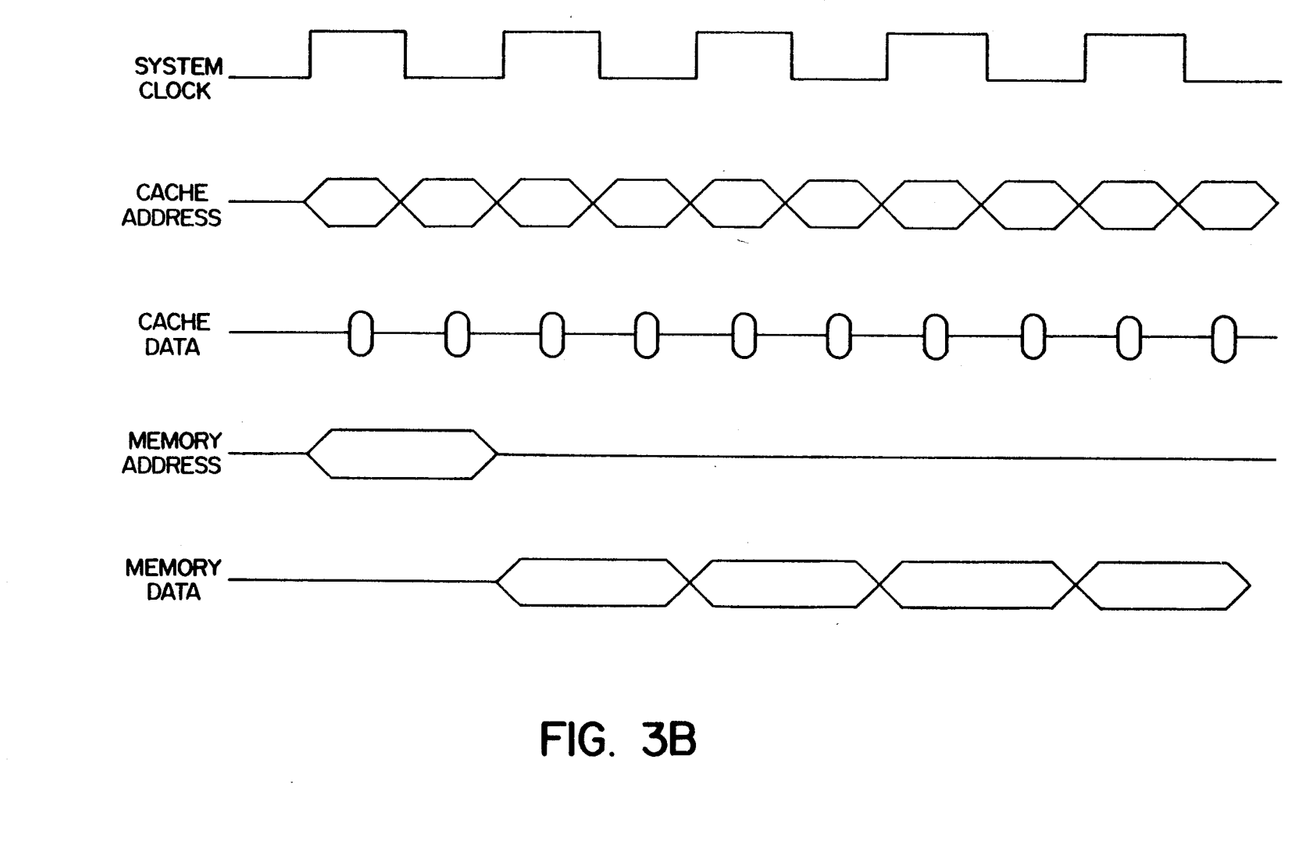
FIG. 3B is a waveform diagram illustrating the operation of the processor shown in FIG. 3A.

For example, the cache bus transfer rate with a 20 MHz clock rate is nominally at 320 MB/sec if the data and address information is added together. This transfer rate is expected to increase linearly with the MP clock rate. On the other hand, the system memory bus transfer rate can be expected to remain at or below one quarter of the combined cache data and address traffic rate (80 MB/sec at 20 MHz clock rate), assuming one 32-bit transfer of data per clock cycle during a memory burst access. In addition, the burst mode operation remains in either a read or write mode during the extended access and does not change from a read to a write in as short a time as on the cache bus. This means that the data transfer rate is slower on the memory bus and is also valid for a greater proportion of the cycle period. FIG. 3B illustrates examples of cache bus and memory bus transfer rates.

The control circuit of each CM comprises a maintenance memory controller (MMC) 35, a match circuit (MC) 36 and an interrupt controller 37. Each CM may also comprise one or more blocs of system memory such as indicated by local memory 38. These units are joined together by various control leads that will be explained later and by address and data buses designated as local buses. These are of course extended on the backplane to the system memory and I/O ports. Each CM also includes its own clock circuit 39. For purposes of this description the clock circuit may be assumed to comprise a conventional K1100 series oscillator having a frequency of 40 MHz and a divide-by-two circuit to provide a 20 MB/sec clock signal. Since each CM is driven by its own independent clock, the circuitry of the MMC 35, the MC36, and interrupt controller 37 must be different from the similar circuits in the prior art. These circuit differences are explained below in detail.

It should be kept in mind that an access to an I/O port must be treated differently than an access to system memory since the CMs are then communicating to the same physical device and thus errors during I/O write operations are generally not recoverable. It should also be remembered that although both CMs are continuously processing information, only one CM is declared active whereas the other CM is declared inactive. For example, during I/O read operations, the inactive CM disables its address bus to the port while the active CM drives the port request. The port that is selected returns data and data transfer acknowledgements (DTACKS) to both CMs in synchronization. On the other hand, during I/O write operations the inactive CM disables both its address and data buses to the selected port whereas the active CM drives the address and data information to the appropriate port. Both CMs are then returned a DTACK and possibly a parity bit in synchronization. It is therefore seen that I/O accesses by the CMs require that they be synchronized.

General Description of Operation

As illustrated in FIG. 3A, each CM is provided with its own independent clock circuit 39. Even with close tolerance oscillators, the clock signals for the CMs will usually slowly drift apart. In accordance with the invention, this drift is allowed to occur in a predefined manner so that although each CM is allowed to process the software stream at the rate defined by its own clock, it is periodically brought back into synchronization with its mate CM. This is achieved basically with a counter adapted to count every instruction performed by the processor. When the instruction counter associated with a CM reaches a predetermined count, it causes its associated MMC 35 to generate a signal to disable the instruction cache of its associated processor thereby forcing a cache-miss operation that forces the processor to access system memory. The MMC 35 then delays the DTACK signal from the system memory to the processor thereby forcing it to halt until the two CMs have reached the same point or rendezvous in the software stream.

While a software stream is being processed, the match circuitry is comparing the data and address information from both CMs. However, because the two CMs are not in step due to the independent clocks, each match circuit is provided with a pair of FIFO memories, one for its own data and address information and one for the data and address information of the mate CM. Of course, processor systems without write buffers would not require dual FIFOs. The FIFOs fill up at the memory bus cycle rate and are emptied as the previous cycles are compared. Thus the FIFO-write controls advance independently, but the FIFO-read controls advance together as successive entries are matched. Comparisons can be made continuously as long as neither planes' FIFO is empty. Whenever a mismatch is detected, the MMCs force the CMs to enter into a maintenance mode to identify the problem and take corrective action in the conventional manner. The address and data information to the FIFOs may be exclusive-ORRED together to minimize their size and the bus bandwidth between the match circuits. Each match circuit is also required to store the address of each read and write FIFO entry in separate memories so that the address of a mismatch fault may be read back by software during error recovery.

As indicated above, the clock drift that occurs between the independently-clocked CMs is handled through the use of rotating memories or FIFOs. The maximum tolerable amount of time before the clock drift is handled is defined by the FIFO depth in the match circuit whereas the point at which the drift is handled is defined by the instruction counter. Assuming a conventional oscillator stability of 0.01% maximum at a frequency of 40 MHz for each CM clock circuit, the worst timing skew between the two CMs would be 5 picoseconds every 25 nanoseconds. To calculate the maximum amount of time that would elapse between rendezvous points, it must be assumed that a CM is not executing out of cache but out of slower system memory consuming eight cycles per memory access. Assuming that both instruction and data references are running out of slow system memory and assuming a predetermined count of 1000 instructions:

with 1000 instructions: 1000 instr ref.+1000 data ref at 20 MHz (50 ns clock)
= 2 (1000×8 clocks×50 ns)
= 800 microseconds.

Therefore, with a 5 picosecond skew every 25 ns, the CMs would be out of phase under worst case by 160 ns or 3.2 clocks in an 800 microsecond period. That is, the CMs will be running independently within a skew between 0 and 3.2 clock cycles which correspond to less than 2 memory instructions. Thus, a FIFO depth adequate to absorb this skew and any delay in control signals is necessary.

As discussed above, accesses to I/O ports must be done during a period when the CMs are in synchronization since they must send or receive from single non-duplicated physical locations. When an access to an I/O port is requested between rendezvous points, the MMCs are adapted to recognize the address of an I/O port and respond to that recognition by delaying the DTACK from the addressed port until a handshake operation is complete; that is until both CMs have received their respective DTACK. Since this handshake operation in effect resynchronizes the CMs, it is entirely possible to reset the instruction counters at this point. However, in this embodiment, it has been found desirable to maintain a constant self resetting instruction counter cycle.

Interrupt signals to a processor are control signals that indicate tasks that must be performed by the processor usually on a priority basis. These signals may originate from the operating system sometimes on a periodic basis but more often they originate from the I/O ports on a completely asynchronous basis. The latter most often correspond to service requests originating at the periphery of the switching system.

In the existing processors such as described in the referenced documents above, each of the duplex processors recognize the same interrupts and proceed to complete the requested tasks immediately and at the same time. However, in the system described above, the pair of processors are not in lock-step except at the rendezvous points. Since it is necessary that both processors handle interrupt signals identically, they are handled only at those rendezvous points.

Each CM's interrupt controller 37 will present a prioritized interrupt signal to its own processor during the re-phasing operation when both processors are stalled, waiting for the cache-miss operation to be completed. It was shown previously that the maximum time between re-phasing would be about 800 microseconds which would then also be the maximum time between interrupt presentation.

It should be noted that this method of interrupt presentation only applies to interrupt signals that must be presented to both CMs such as peripheral interrupts and operating system timers. Unmatched interrupts such as parity error and memory error may be treated asynchronously and asserted immediately with regard for each CM's instruction point since a mismatch and consequent maintenance procedure is already being implied.

Maintenance Memory Controller

The maintenance and memory controller (MMC) in each CM provides numerous functions associated with the interfacing of the processor with the memory system, the input/output ports, the clock system, the matching circuitry, sand the interrupt mechanism. These are the functions which are affected by providing the CM of each plane of the system with an independent clock source. It should however be realized that the MMC also comprises the maintenance control circuitry which is activated on a mismatch between the pair of CMs in order to identify which one is insane and to take corrective action. These functions are well-documented in the art as for example in the above-referenced documents.

Figure 4A:
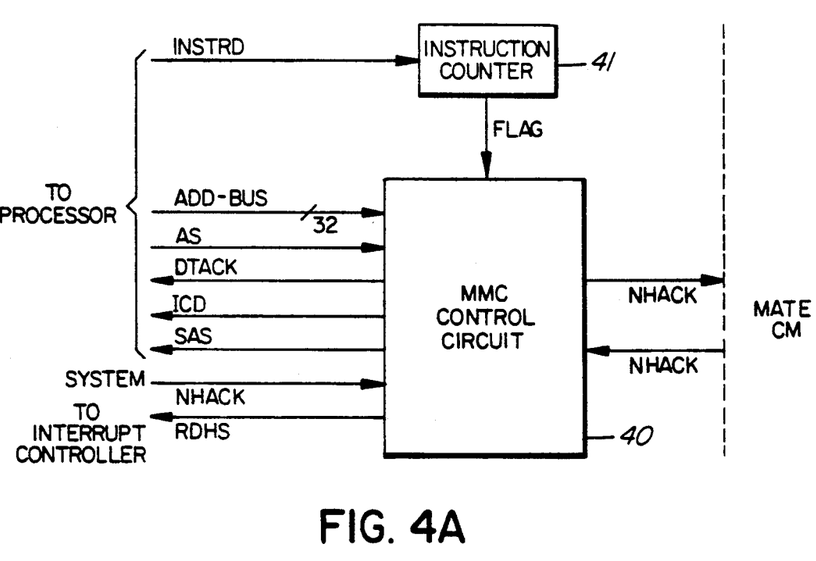
FIG. 4A is a block circuit diagram of the maintenance memory controller circuit shown in FIG. 3A.
Figure 4B:
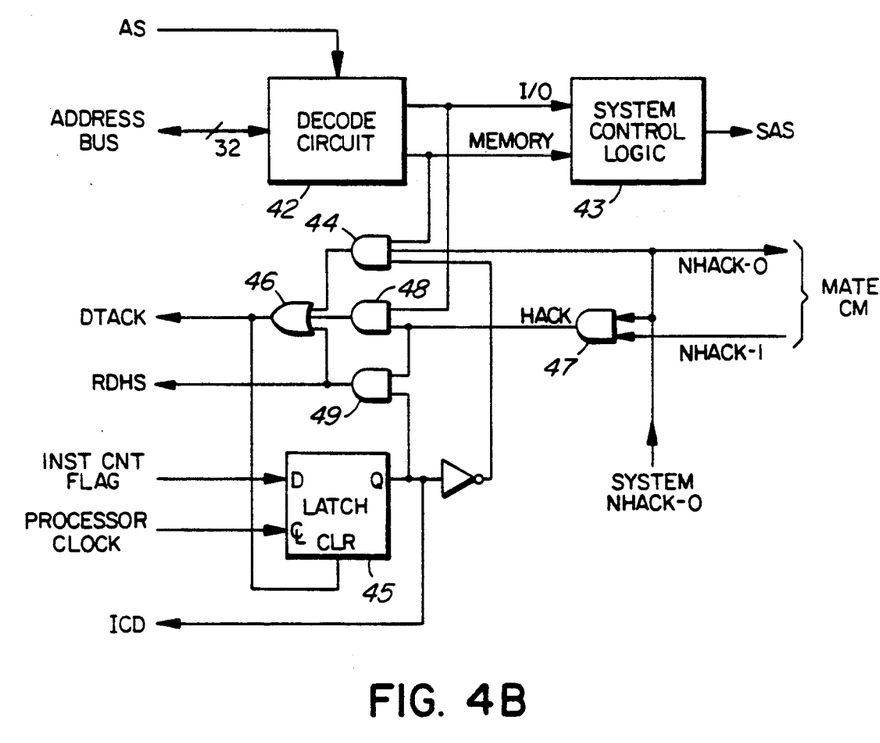
FIG. 4B is a logic circuit diagram of the maintenance memory controller circuit of FIG. 4A.

As shown in FIGS. 4A and 4B, each MMC 40 is connected to the system memory via the address and data busses of the CM, the processor, the input/output ports and to the mate CM in order to exchange handshake signals as described later, and various other signals necessary to the maintenance and corrective actions upon a mismatch being declared. An instruction counter 41 receives a signal (INSTD) from the microprocessor each time that the latter performs an instruction. Upon reaching a predetermined count, the counter 41 generates an instruction count flag signal to the MMC control circuit. The counter 41 may conveniently be of the type that resets itself automatically when it reaches a predetermined count; however under some circumstances it may be desirable to use one of the externally resettable type. A circuit 42 is responsive to the local address on the address bus and an address strobe (AS) signal from the MP for decoding the address and thus recognizing it as either an address to system memory or an address to an input/output port. A system control logic circuit 43 is responsive to these signals for providing system address strobe signals (SAS) to the appropriate destination circuit. The destination circuit responds with an acknowledgement signal NHACK-0 which is intended to inform the microprocessor by a data transfer acknowledge signal DTACK that the data generated as a result of the address just generated on the local bus is now available on its data bus thereby allowing the microprocessor to proceed further. The NHACK-0 is sent to the mate processor and to an AND gate 44 which also has inputs connected to the memory address output of the decode circuit 42 and to an inverted output of latch circuit 45. During an instruction that provides a memory address and which does not correspond to a rendezvous, gate 44 generates a DTACK signal to the CPU via an OR gate 46.

A gate 47 provides the AND function of NHACK-0 and NHACK-1 from the mate processor to generate a handshake acknowledge signal HACK which indicates that the same instruction is being performed by both CM-0 and CM-1. During an instruction that provides an address to an I/O port, an AND gate 48 is responsive to a handshake signal HACK to generate a DTACK signal to the CPU. The mate MMC also generates its own DTACK-1 signal. Thus, during an I/O instruction, the controller causes an artificial rendezvous whereat the instruction counter is not reset but the processors in each plane are brought back in-step.

At the predetermined count of the instruction counter, the latch circuit is set and its output signal (ICD) is effective to disable the instruction cache-0 thereby forcing a cache-miss cycle. Under these circumstances the DTACK-0 and DTACK-1 signals will only be generated when the two processors are at the same point in the software stream; that is, when the gate 49 in each of MMC-0 and MMC-1 has generated the AND function of their respective HACK and instruction count flag signals. The DTACK signal clears the latch 50 of the instruction count flag.

Match Circuit

Due to the extremely high transfer rate across the cache bus and the very short time during which data may be valid on the bus, matching cache buses between CMs is not practicable if at all feasible. Such a system would introduce very critical timing margins and would offer little significant value over a system which assures duplex operation over the memory bus.

As mentioned above, the described embodiment compares memory bus cycles as opposed to cache bus cycles. The cache bus transactions may be verified through a parity check on each byte of data and tag information. Parity errors on the cache bus will result in an immediate mismatch on the memory bus as the MP attempts an off-cache retry for correct information. Write errors on the cache bus will be detected as they are propagated through to the memory bus. Read errors on the cache bus that do not generate any parity bit errors are very likely to result in a mismatched memory bus access before any I/O accesses are performed. When such a memory bus mismatch is detected, the cache operation may be tested or compared against its image within the memory system. It may be noted that it is possible that the cache address originally responsible for the undetected error may be lost by this time; however, this would only be the case for transient faults which are impossible to verify with conventional matching as well.

Figure 5A:
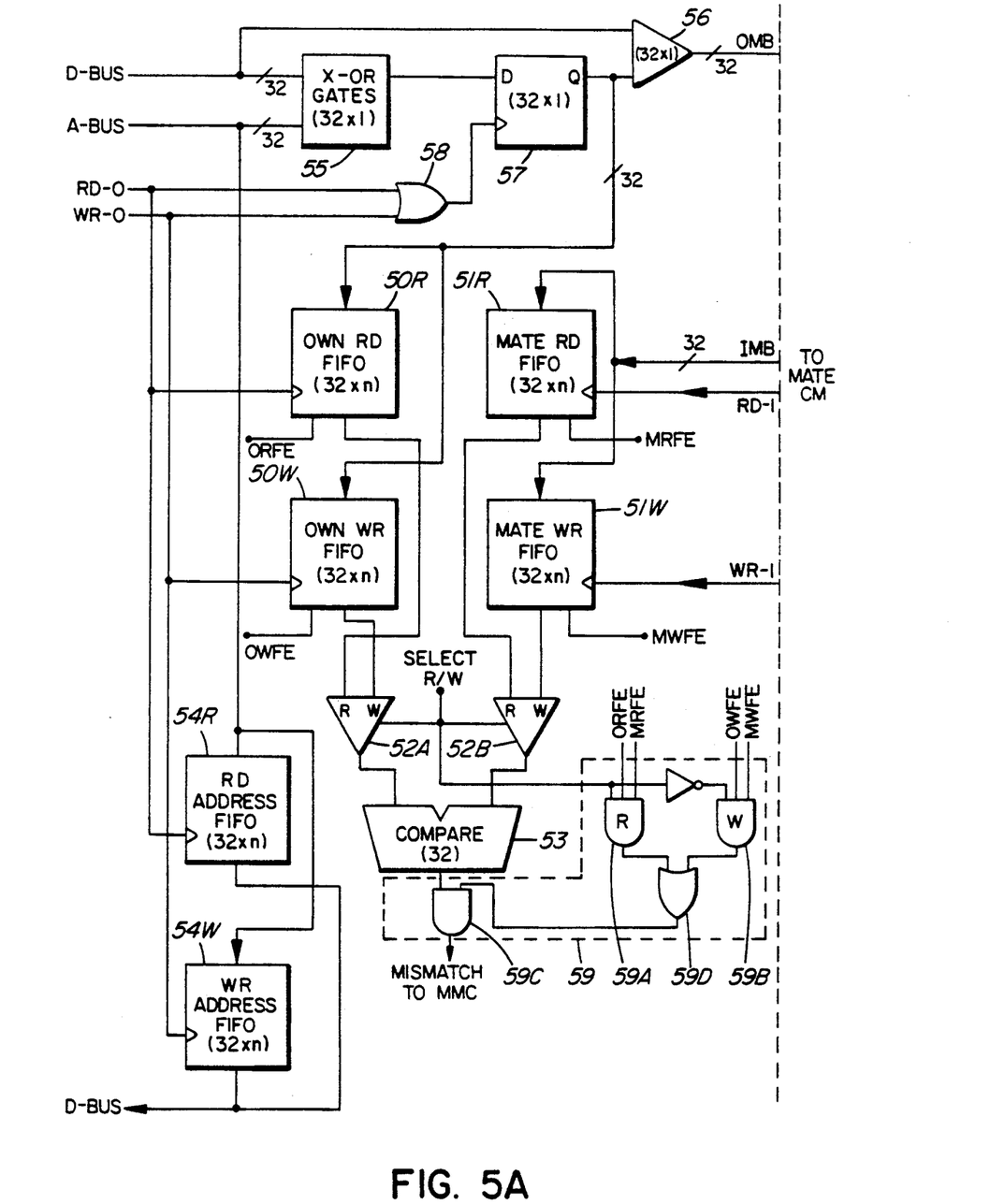
FIG. 5A is a logic circuit diagram of the match circuit shown in FIG. 3A.

A true match can be comfortably maintained at the memory bus transaction rate if the match circuit is completely tolerant of the maximum skew that may exist between the pair of CMs. FIG. 5A illustrates in detail the match circuit shown in FIG. 3A, which is adapted to perform that function. Each match circuit comprises a first pair of first-in-first-out memories (FIFO) 50R, 50W for storing respective information related to read and write instructions obtained from the address and data buses and a second pair of FIFOs 51R, 51W for storing information related to the mate CM, this information being received from the incoming match bus (IBM) from the mate CM. The outputs of these FIFOs are fed through transmission gates 52A, 52B to the inputs of a compare circuit 53 which is adapted to simultaneously compare 32 bits of data from each one of a pair of FIFOs 50R, 51R, or 50W, 51W, and generate a mismatch signal to the MMC 35 upon such an occurrence. The gates 52A, 52B are controlled by a SELECT R/W signal that may for example be the system clock signal or a derivative thereof. On one half of the clock signal period, the contents of the read FIFOs are compared and on the other half of the clock signal period, the contents of the write FIFOs are compared.

Also comprised in the match circuit are a third pair of FIFOs 54R, 54W having their inputs connected to the address bus of the CM. Each of FIFO 54R or 54W is responsive to read or write signals from the CM for inputting the address of each read or write instruction. In these drawings, the notation 32 denotes the number of parallel lines on a bus or number of parallel gates or storage locations and n denotes the depth of the FIFOs.

The address and data buses are connected to a plurality of exclusive-OR gates 55 having their outputs connected to driver gates 56 via a plurality of flip-flops 57 clocked by a signal from OR gate 58. The output leads from gate 56 form the output match bus (OMB) for providing matching information to the match circuit of the mate CM.

Also included in the match circuit of FIG. 5A is a logic circuit 59 that ensures that the result of the compare function is only enabled when the FIFOs being compared each contain at least one entry. Each of FIFOs 50R, 51R, 50W and 51W provide a FIFO empty bit on leads ORFE, MRFE, OWFE, MWFE respectively associated therewith. These are connected to a respective one of AND gates 59A and 59B each having a third input connected to the SELECT R/W signal. The outputs of gates 59A and 59B are connected to another AND gate 59C through an OR gate 59D. Whenever a read or a write comparison is selected, the FIFO EMPTY (FE) signals from the selected FIFOs must be unasserted (HIGH); otherwise the associated gate 59A or 59B will not enable the gate 59C thus preventing a mismatch signal from being sent to the MMC.

It should be realized that all of these circuits may be realized using conventional integrated circuit components. For example, the FIFO may be a type 74S374 register file addressed by ring counters of the type 74S233.

Operation

On every instruction, when the RD-0 or WR-0 signal is present, the outputs of the X-OR gates 55 are fed to the OMB and to the appropriate one of FIFOs 50R, 50W. Similarly, on every instruction of the mate CM, the local bus information appearing on the IMB is fed to the appropriate one of FIFOs 51R, 51W depending on which one of the RD-1 or WR-1 control lead is active.

As discussed previously, since cache bus faults are ultimately represented as mismatches between CMs on the local bus, it is in this circuit that the main duplex verification is performed. Since each CM is clocked independently, a skew will exist between the pair of CMs and a match between them is achieved using FIFO buffers before the matching circuitry on each plane. The FIFO must be sufficiently large to absorb the maximum skew due to clock drift and system response variations.

The FIFOs 50R, 51R, 50W, 51W fill up at the local bus cycle rate and are emptied as the information from previous cycles is compared. Therefore, the FIFO-write controls of the two CMs advance independently but the FIFO-read controls advance together as successive entries are matched. Comparisons can be made continuously as long as neither planes' FIFOs are empty. The match operation can therefore proceed regardless of the present skew between the CM clocks and the skew in system memory transactions. In the example given above, the maximum skew between the pair of CMs is being controlled to the equivalent of 3.2 MP clock cycles when using a 20 MHz clock. If 3 clock cycles were used for the fastest possible memory transaction to be matched then, at 3 cycles each, the two CMs would be skewed by only about one memory transaction. The FIFO depth would therefore need only one entry to handle the clock drift effects. Any additional FIFO depth could absorb other variables such as the time to cross planes and control signal differences; for example, a FIFO depth of 8 entries (n=8) has been found to be completely adequate using the described clock system parameters.

In practice, a skew of 3 clock cycles would rarely be reached since all accesses between re-phasing would have to be slow non-cacheable accesses. Also, all I/O port accesses involve handshake operations which pull both CMs back into step. The instruction count handshake also acts as a safeguard against excessive skew in the absence of I/O accesses.

As described above, the data-bus information is exclusive-ORED with the information on the address-bus. This allows the OMB to carry information which is only 32 bits wide and the FIFOs to also be only 32 bits wide. Also, the addresses of the instructions are stored in separate circular buffers (FIFOs 54R, 54W). On a mismatch, the FIFOs are frozen and can be read out by software to determine if it is an address or a data mismatch. The data of the preceding cycles can also be determined since $[(A \oplus D) \oplus A] = D$ where $A$ = address information, and $D$ = data information.

Figure 5B:
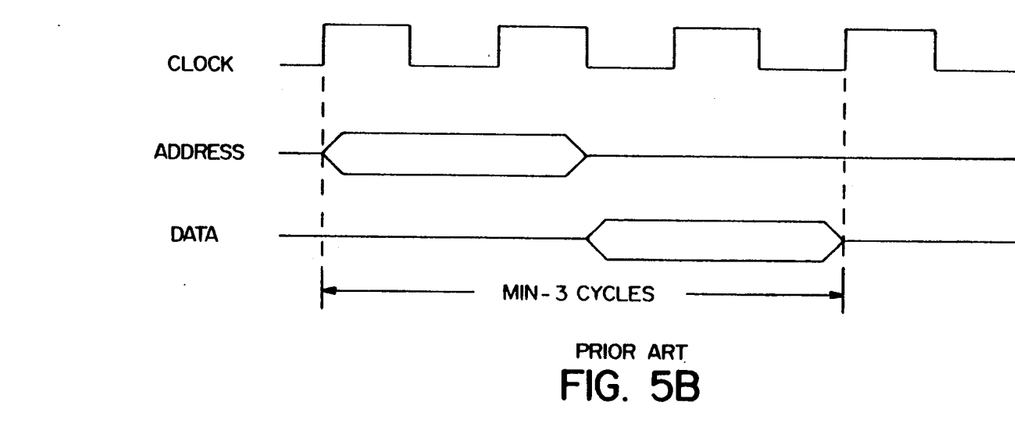
FIG. 5B is a waveform diagram illustrating the operation of the match circuit in FIG. 1.
Figure 5C:
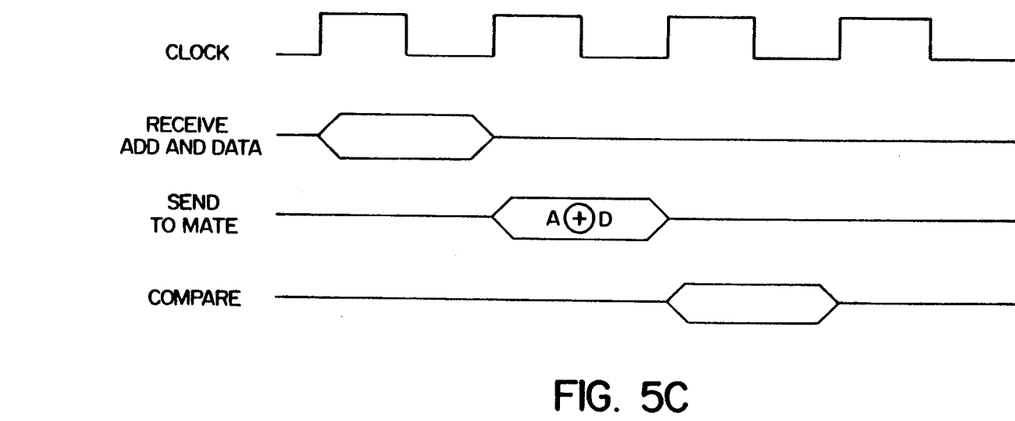
FIG. 5C is a waveform diagram illustrating the operation of the match circuit in FIG. 5A.

As shown in FIG. 5B, the conventional method of matching address and data information requires that both the address and data information be matched on each instruction whereas in this circuit, only the exclusive-OR information is matched. Since the information is stored in FIFO memory, the matching scheme allows pipelining of matching operations and provides fault detection after a low latency equal to the skew between the FIFOs.

Figure 5D:
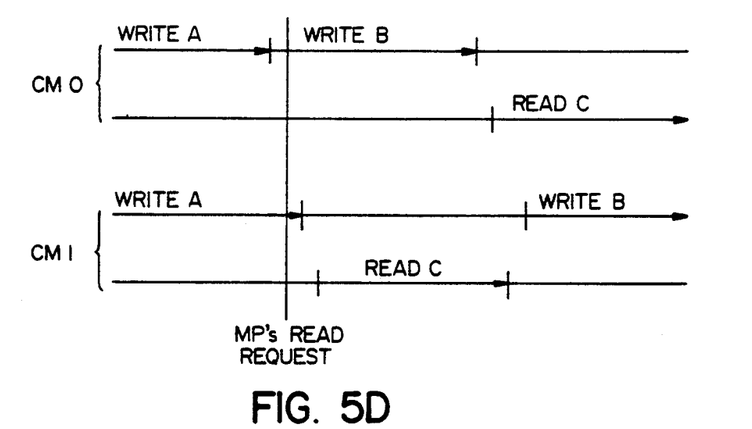
FIG. 5D is a timing diagram related to the function of the match circuit of FIG. 5A.

It may be noted that having a pair of FIFOs, one for read instructions and one for write instructions allows a transaction reordering of instructions being matched. FIG. 5D illustrates an example of a computing module pair operating in duplex while executing two different memory bus transaction orders. Since write information is buffered and written separately, it is possible for a late DTACK from system memory to cause the subsequent memory bus transaction order to change. With one CM, the late write instruction termination allowed the MP to generate a read request while the other CM was allowed to service the next write instruction in the write buffer before the CPU read request was asserted. Since the match circuitry incorporates separate FIFOs for both read and write instructions, the latter are stored in order according to their type and are therefore matched in order according to their type.

Interrupt Controller

As mentioned above, each CM is provided with an interrupt controller circuit to insure that interrupt signals are recognized identically and presented to their respective CM at the same rendezvous point.

Figure 6A:
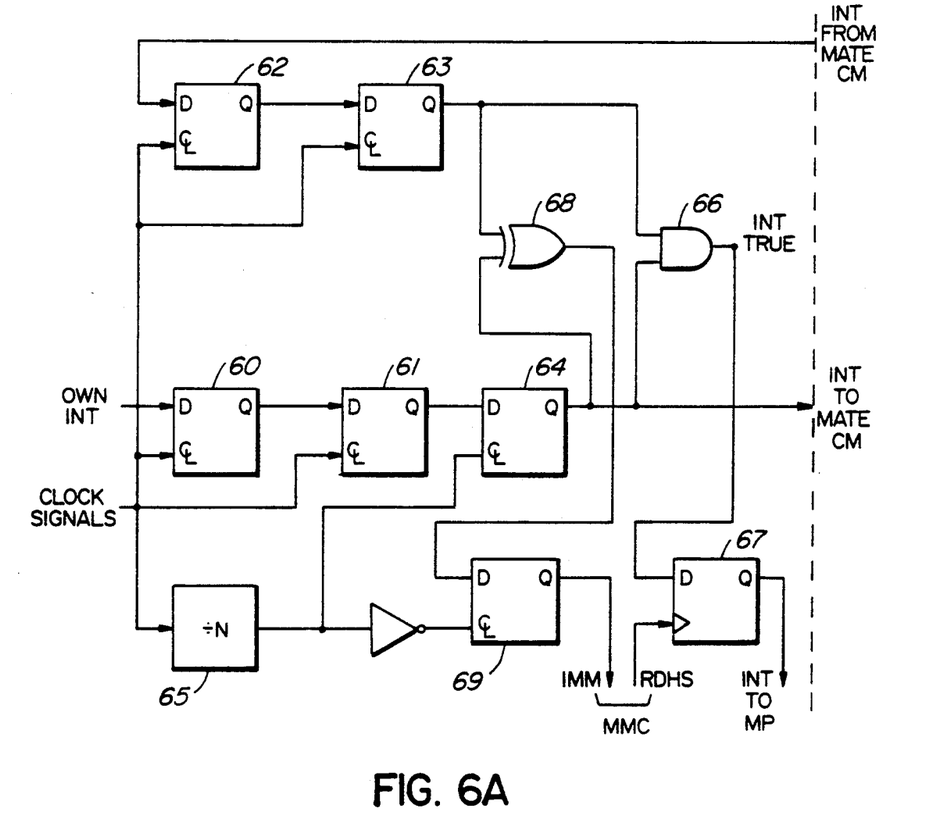
FIG. 6A is a logic circuit diagram of the interrupt controller shown in FIG. 3A.
Figure 6B:
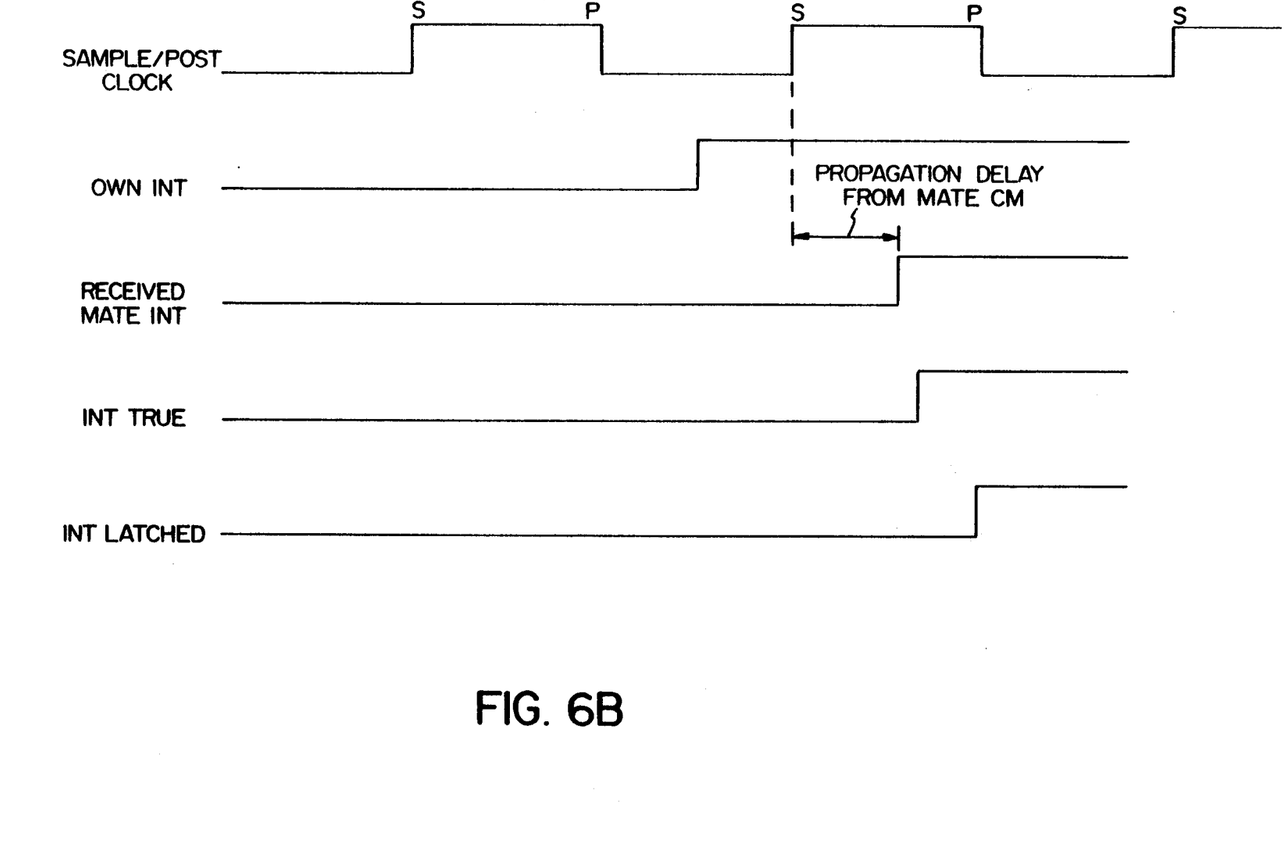
FIG. 6B is a waveform diagram illustrating the timing within the circuit of FIG. 6A.

As illustrated in FIGS. 6A and 6B, an interrupt received at an interrupt controller is resynchronized to the clock associated with that CM to prevent metastable conditions from occurring. This is achieved by flip-flops 60 and 61 which are double-clocked by the CM's own clock signals. Similarly the interrupt signal from the mate interrupt controller is double-clocked through flip-flops 62 and 63 to also resynchronize that signal to the CM's own clock signals. The output of flip-flop 61 is then clocked to the mate interrupt controller through a flip-flop 64 which is clocked by signals from a sample/post clock 65. The latter consists of a circuit for providing clock signals that represent a dividend of the CM's own clock and may therefore simply comprise a divide-by-n circuit. The period of the sample/post clock is chosen to correspond to the maximum duration of an instruction and must exceed the maximum expected skew between two interrupts to permit mismatch detection. In the example described above, this period corresponds to eight clock periods. The flip-flop 64 together with the sample/post clock circuit provide a delayed interrupt compare function to prevent the situation when an incoming interrupt signal was sampled in such a way as to be identified by one controller but narrowly missed by the other controller. This is a statistical possibility that may occur towards the end of a rendezvous period. Since the interrupt posting is based on an instruction count instead of a clock count, the posting is presented to both MPs at the same instruction point regardless of the memory speed.

The outputs of flip-flops 63 and 64 drive an AND gate 66 whose output becomes true if their own and mate's interrupt signals are true. The output of gate 66 is latched into flip-flop 67 at the occurrence of the next handshake signal (RDHS) from the MMC indicating a rendezvous point. The output of the latch 67 is then posted to its associated processor for handling in the usual way.

The outputs of flip-flops 63 and 64 are also X-ORRED in gate 68 whose output is clocked into a flip-flop 69 by an inverted sample/post clock signal. Thus, if the difference between the latched interrupts exist for at least one-half the period of the sample/post clock, an interrupt mismatch signal (IMM) is generated at the output of flip-flop 69 and transmitted to the MMC which initiates maintenance procedures in the usual manner.

It should be realized that some systems operate on a priority of interrupt basis. In such systems, it would therefore be necessary to provide an interrupt controller circuit for each predetermined level of interrupt signals and a priority circuit for posting the interrupt to the processor in a predetermined sequence.

Figure 7:
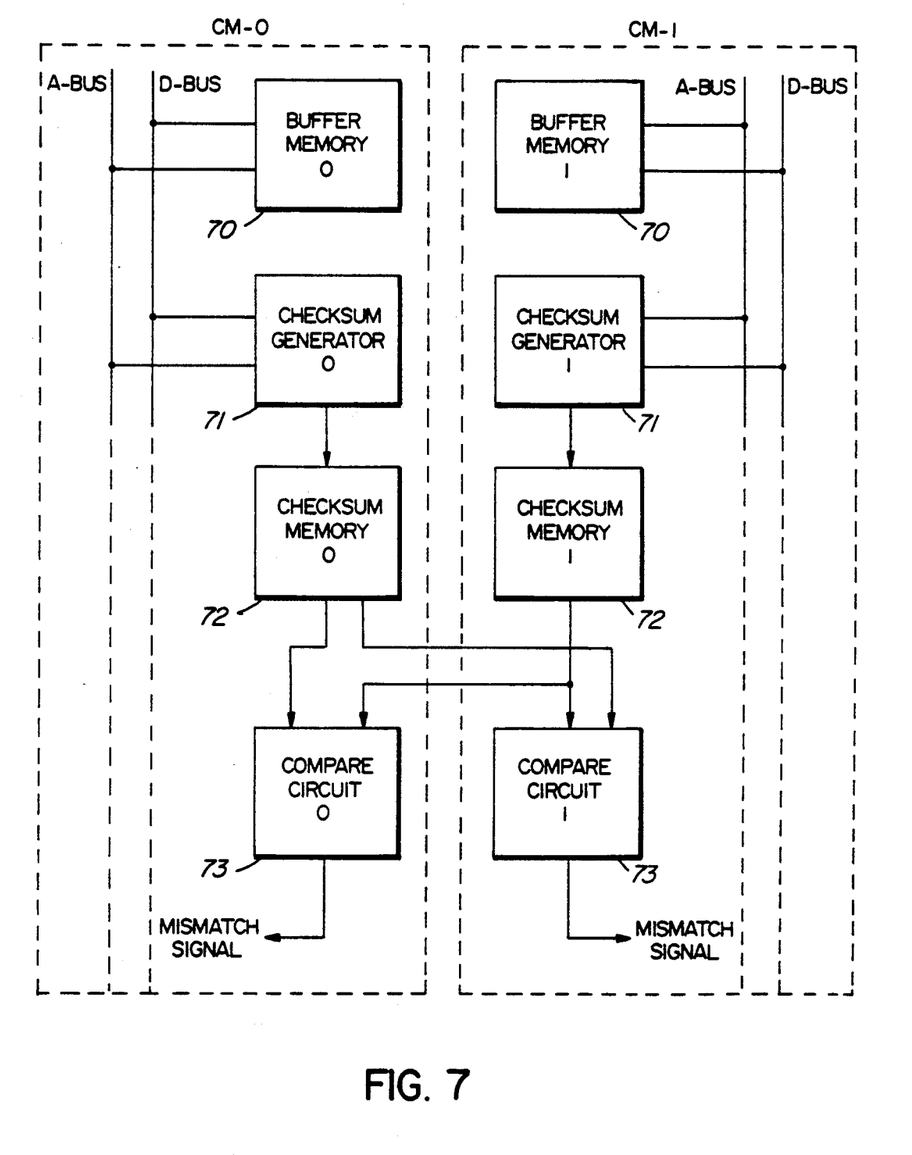
FIG. 7 is a logic block diagram of an alternate embodiment of a match circuit for use in a duplex processor arrangement.

FIG. 7 illustrates an alternate embodiment of a match circuit for use in a duplex processor arrangement. A pair of trace buffers 70, one in each computing module, are filled with a history of y bus cycles (address and data information). Concurrently, a pair of checksum generators 71 generate the respective checksum of the information contained in each buffer memory 70 and update their respective register 72. On the y-th cycle, the checksums are compared in comparator circuits 73, and if they match, the processors are allowed to continue. Should one processor be ahead of the other, it is simply forced to wait for the other processor to catch up and for a match of checksums before proceeding further.

So long as the two processors execute the same code and the data/address information is the same on both planes for y cycles, the two CMs will stay in pseudo-synchronization regardless of clock frequency variation and skewed memory refresh cycles. Since the two planes run on their own clock, full simplex speed is achieved. A wait state or two may be inserted at the rendezvous if the two processors are out of step. This is a negligible performance penalty when it is considered that in the existing lock-step duplex processor arrangements, wait states are introduced into every bus cycle that has different access periods for the two processors in addition to the handshake overhead on each instruction.

If the two planes' checksums disagree at rendezvous, the trace buffers are frozen and the process of mismatch handling is initiated. The buffers can now be used to trace the cause of the mismatch.

The duplex processor arrangement of the invention provides a redundant system exhibiting substantial advantages over the known systems. The effects of timing margins on handling functions such as interrupt and duplex matching are minimized and these functions are achieved reliably and quickly without the need to perform handshaking on every instruction. In addition, the system is adapted to operate with higher clock rates and newly available high performance microprocessors.

Whereas the above description of the invention was presented for purposes of illustration, many variations and modifications are possible in view of the above teachings without departing from the scope and spirit of the invention.

What is claimed is:

1. A method of controlling a duplex processor arrangement comprising a pair of computing circuits each comprising a processor portion and a control portion, the processor portion including a microprocessor and an associated instruction cache memory and the control portion comprising a maintenance controller, a match circuit, and an interrupt controller, the maintenance controller, match circuit and interrupt controller of each computing circuit being responsively interconnected to each other and connected to their respective processor portion as well as to respective mate circuits in the other of the computing circuits, the control portion also including an instruction counter for cyclically counting to a predetermined number instructions executed by its respective microprocessor, each of the computing circuits being driven from a respective independent clock circuit, the method comprising the steps of, each of the instruction counters counting the instructions executed by its associated microprocessor, the instruction counter to first reach the predetermined number generating a flag signal, and, the maintenance control associated with that instruction counter responding to the flag signal by inhibiting execution of further instructions by its associated microprocessor until the instruction counter of the other computing circuit has also reached the predetermined number whereby a rendezvous between the computing circuits has occurred, the inhibiting step being achieved by the maintenance controller responsive to the flag signal generating an instruction cache disable signal that causes a cache-miss cycle to occur at the processor instruction that is coincident with the flag signal and for preventing completion of the cache-miss cycle until the match circuits of the computing circuits and the maintenance controller associated with the instruction counter to first reach the predetermined number have determined that the computing circuits are at the same point in the software processing stream.

2. A method as defined in claim 1 wherein each match circuit comprises buffer memories for storing data/address information related to a predetermined number of instructions performed by both computing circuits and comprising the further steps of, writing the buffer memories independently from one another and reading them out together to a comparing circuit as successive entries are matched.

3. A method as defined in claim 2 wherein each match circuit provides an alarm signal to its respective maintenance controller thereby to initiate maintenance procedures whenever a mismatch between the data/address information in the buffer memories is detected, the method further comprising the step of continuously comparing memory entries between rendezvous.

4. A method as defined in claim 3 and comprising the additional step of exclusive-ORRING the data/address information related to every instruction before storing it in the buffer memories of the match circuits.

5. A method as defined in claim 4 and comprising the further step of storing the addresses of the related exclusive-ORRED information in a separate buffer memory in the match circuits thereby enabling the generation of the original data information.

6. A method as defined in claim 1 wherein each maintenance controller has the capability of recognizing whether data on the address bus of its associated computing circuit designates an access to either an input/output port or to system memory, the method comprising the further steps of, on identification by a maintenance controller of an instruction related to an access to an input/output port, inhibiting the completion of that instruction until the match circuits of the computing circuits and the maintenance controller that identified the instruction related to an access to an input/output port have determined that the computing circuits are at the same point in the software processing stream and, resuming processing of instructions.

7. A method as defined in claim 6 and comprising the further step of resetting the instruction counter in each computing circuit upon the completion of an input/output access instruction.

8. A method as defined in claim 1 comprising the steps of continuously comparing the two sets of data resulting from the instructions executed by both computing circuits when the data becomes available and generating an alarm signal upon a mismatch therebetween.

* * * * *